US009707942B2

(12) United States Patent
Cheatham, III et al.

(10) Patent No.: US 9,707,942 B2
(45) Date of Patent: Jul. 18, 2017

(54) SYSTEMS AND METHODS FOR DETERMINING A ROBOTIC STATUS OF A DRIVING VEHICLE

(71) Applicant: Elwha LLC, Bellevue, WA (US)

(72) Inventors: Jesse R. Cheatham, III, Seattle, WA (US); Roderick A. Hyde, Redmond, WA (US); Lowell L. Wood, Jr., Bellevue, WA (US)

(73) Assignee: ELWHA LLC, Bellevue, WA (US)

( * ) Notice: Subject to any disclaimer, the term of this patent is extended or adjusted under 35 U.S.C. 154(b) by 16 days.

(21) Appl. No.: 14/099,060

(22) Filed: Dec. 6, 2013

(65) Prior Publication Data

US 2015/0158469 A1 Jun. 11, 2015

(51) Int. Cl.
| | |
|---|---|
| *B60T 7/12* | (2006.01) |
| *B60T 7/22* | (2006.01) |
| *B60T 8/1755* | (2006.01) |
| *B60W 40/04* | (2006.01) |
| *B60W 50/14* | (2012.01) |
| *B60W 30/16* | (2012.01) |
| *B60W 50/00* | (2006.01) |

(52) U.S. Cl.
CPC ...... *B60T 7/12* (2013.01); *B60T 7/22* (2013.01); *B60T 8/17558* (2013.01); *B60W 40/04* (2013.01); *B60T 2201/022* (2013.01); *B60T 2201/03* (2013.01); *B60T 2250/00* (2013.01); *B60W 30/16* (2013.01); *B60W 50/14* (2013.01); *B60W 2050/0095* (2013.01)

(58) Field of Classification Search
USPC .......................................... 701/96
See application file for complete search history.

(56) References Cited

U.S. PATENT DOCUMENTS

| | | | | |
|---|---|---|---|---|
| 5,366,896 | A | * 11/1994 | Margrey | G01N 35/00871 422/105 |
| 5,448,479 | A | * 9/1995 | Kemner | B62D 1/28 180/167 |
| 5,493,694 | A | * 2/1996 | Vlcek | G08G 1/205 455/404.2 |
| 5,983,161 | A | 11/1999 | Lemelson et al. | |
| 6,032,097 | A | 2/2000 | Iihoshi et al. | |
| 6,615,137 | B2 | * 9/2003 | Lutter | G08G 1/0965 340/436 |
| 6,724,321 | B2 | 4/2004 | Kuragaki et al. | |
| 7,073,198 | B1 | * 7/2006 | Flowers | H04L 63/1433 713/151 |
| 7,124,027 | B1 | 10/2006 | Ernst, Jr. et al. | |
| 8,229,663 | B2 | * 7/2012 | Zeng | B60W 40/02 180/168 |
| 8,346,391 | B1 | * 1/2013 | Anhalt | B25J 9/163 700/245 |
| 8,352,112 | B2 | 1/2013 | Mudalige | |

(Continued)

*Primary Examiner* — Jean-Paul Cass (57) ABSTRACT

A system for assisting driving includes a robotic status component and a maneuver selection component. The robotic status component is configured to determine, within a first vehicle, robotic status information pertaining to a proximate second vehicle. The second vehicle includes a vehicle controlled independently of the first vehicle. The maneuver selection component is configured to select at least one driving maneuver based on the robotic status information using an automatic driving system of the first vehicle.

42 Claims, 7 Drawing Sheets

(56) References Cited

U.S. PATENT DOCUMENTS

| | | | |
|---|---|---|---|
| 8,457,877 B2 | 6/2013 | Kelly et al. | |
| 8,538,674 B2 | 9/2013 | Breuer et al. | |
| 8,577,126 B2* | 11/2013 | Jones | G06F 3/017 348/114 |
| 8,583,358 B2 | 11/2013 | Kelly et al. | |
| 8,594,920 B2 | 11/2013 | Shida | |
| 8,670,891 B1* | 3/2014 | Szybalski | B62D 1/286 701/23 |
| 8,676,466 B2 | 3/2014 | Mudalige | |
| 8,712,643 B2* | 4/2014 | Pampus | B60W 30/06 180/445 |
| 8,744,664 B2* | 6/2014 | Day | G05D 1/0278 701/25 |
| 8,761,964 B2* | 6/2014 | Lee | B64C 19/00 244/189 |
| 8,811,607 B2* | 8/2014 | Kudoh | B25J 9/0003 380/277 |
| 8,825,265 B1* | 9/2014 | Ferguson | G05D 1/0212 701/23 |
| 8,849,494 B1* | 9/2014 | Herbach | B60W 30/00 701/24 |
| 8,874,266 B1* | 10/2014 | Francis, Jr. | G05B 23/0221 700/247 |
| 8,874,360 B2* | 10/2014 | Klinger | G08G 1/162 701/22 |
| 8,874,477 B2* | 10/2014 | Hoffberg | G06Q 10/0631 705/37 |
| 8,885,469 B2 | 11/2014 | Yamashiro | |
| 8,896,162 B1* | 11/2014 | Ledbetter | H01H 3/26 307/326 |
| 8,903,588 B2 | 12/2014 | Schmudderich et al. | |
| 8,909,428 B1* | 12/2014 | Lombrozo | B62D 15/025 701/41 |
| 8,948,955 B2* | 2/2015 | Zhu | G05D 1/0055 701/23 |
| 8,990,139 B1* | 3/2015 | Howard | G06Q 10/101 706/46 |
| 9,031,886 B2* | 5/2015 | Heidasch | G06F 17/30864 706/25 |
| 9,086,700 B2* | 7/2015 | Fernando | G05D 1/024 |
| 9,157,757 B1* | 10/2015 | Liao | G01C 21/20 |
| 9,163,909 B2* | 10/2015 | Chengalva | F41H 7/005 |
| 9,191,237 B1* | 11/2015 | Barry | H04L 51/38 |
| 9,253,455 B1* | 2/2016 | Harrison | H04M 1/0291 |
| 9,310,252 B2* | 4/2016 | Das | G01J 5/0003 |
| 9,346,168 B2* | 5/2016 | Connell, II | B25J 9/1697 |
| 9,626,814 B2* | 4/2017 | Eyring | G07C 9/00031 |
| 2002/0022927 A1* | 2/2002 | Lemelson | G01S 19/11 701/301 |
| 2006/0095195 A1 | 5/2006 | Nishimura et al. | |
| 2007/0010944 A1 | 1/2007 | Ferrebee, Jr. et al. | |
| 2007/0083318 A1 | 4/2007 | Parikh | |
| 2007/0220482 A1* | 9/2007 | O'Sullivan | G05B 19/4093 717/106 |
| 2007/0282532 A1 | 12/2007 | Yamamoto et al. | |
| 2008/0102916 A1* | 5/2008 | Kovacs | G07F 17/3211 463/16 |
| 2008/0189040 A1 | 8/2008 | Nasu et al. | |
| 2009/0222160 A1 | 9/2009 | Morselli et al. | |
| 2010/0036578 A1 | 2/2010 | Taguchi et al. | |
| 2010/0245066 A1* | 9/2010 | Sarioglu | G01S 7/003 340/436 |
| 2010/0256835 A1 | 10/2010 | Mudalige | |
| 2010/0256852 A1* | 10/2010 | Mudalige | G08G 1/163 701/24 |
| 2011/0015802 A1* | 1/2011 | Imes | G05D 23/1923 700/300 |
| 2011/0046792 A1* | 2/2011 | Imes | H04L 67/42 700/278 |
| 2011/0202185 A1* | 8/2011 | Imes | H04L 43/08 700/277 |
| 2011/0227713 A1 | 9/2011 | Amann | |
| 2012/0046859 A1* | 2/2012 | Imes | G05D 23/1905 701/409 |
| 2012/0064923 A1* | 3/2012 | Imes | F24F 11/0012 455/457 |
| 2012/0065876 A1 | 3/2012 | Kadowaki et al. | |
| 2012/0083960 A1 | 4/2012 | Zhu et al. | |
| 2012/0083998 A1 | 4/2012 | Kizaki | |
| 2012/0209505 A1 | 8/2012 | Breed et al. | |
| 2013/0127980 A1* | 5/2013 | Haddick | G06F 3/013 348/14.08 |
| 2013/0132854 A1* | 5/2013 | Raleigh | G06F 3/0482 715/738 |
| 2013/0231779 A1* | 9/2013 | Purkayastha | B25J 9/1697 700/259 |
| 2013/0278631 A1* | 10/2013 | Border | G02B 27/017 345/633 |
| 2014/0136044 A1 | 5/2014 | Conrad | |
| 2014/0303883 A1 | 10/2014 | Aso et al. | |
| 2015/0029335 A1* | 1/2015 | Kasmir | H04N 7/186 348/143 |
| 2015/0302732 A1* | 10/2015 | Wright | G08C 17/02 340/5.25 |
| 2016/0180620 A1* | 6/2016 | Eyring | G07C 9/00031 235/382 |

* cited by examiner

SYSTEMS AND METHODS FOR DETERMINING A ROBOTIC STATUS OF A DRIVING VEHICLE

If an Application Data Sheet (ADS) has been filed on the filing date of this application, it is incorporated by reference herein. Any applications claimed on the ADS for priority under 35 U.S.C. §§119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

CROSS-REFERENCE TO RELATED APPLICATIONS

The present application claims the benefit of the earliest available effective filing date(s) from the following listed application(s) (the "Priority Applications"), if any, listed below (e.g., claims earliest available priority dates for other than provisional patent applications or claims benefits under 35 USC §119(e) for provisional patent applications, for any and all parent, grandparent, great-grandparent, etc. applications of the Priority Application(s)).

PRIORITY APPLICATIONS

None

If the listings of applications provided above are inconsistent with the listings provided via an ADS, it is the intent of the Applicant to claim priority to each application that appears in the Domestic Benefit/National Stage Information section of the ADS and to each application that appears in the Priority Applications section of this application.

All subject matter of the Priority Applications and of any and all applications related to the Priority Applications by priority claims (directly or indirectly), including any priority claims made and subject matter incorporated by reference therein as of the filing date of the instant application, is incorporated herein by reference to the extent such subject matter is not inconsistent herewith.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Automatic driving systems and robotic control of vehicles enable one or more operations of a vehicle to be performed or assisted by a machine rather than a human. Some automatic driving systems allow driving from a current location to a destination to be completely automated. For example, input from a human may not be required in real-time or may not be required at all during driving of the vehicle. Other automatic driving systems provide assistance in the case of an emergency situation. For example, a collision avoidance system may detect a likely collision and apply the brakes, even while a human driver is in control. As used herein, the term collision avoidance system is given to mean a type of automatic driving system that intervenes to provide driving assistance in the case of a likely collision or other emergency.

Applicants have recognized that as more and more operations and systems of vehicles are automated, a greater mix of robotic and human drivers will become present on public roads. Because response times, safety, and driving performance will likely vary significantly between human drivers and robotic systems, and even between different robotic systems, information about capabilities of other vehicles, their robotic status, and/or other information may be very important to nearby vehicles to increase driving safety.

According to one embodiment, a vehicle includes a driving assistant system that includes a robotic status component and a maneuver selection component. The robotic status component is configured to determine, within the vehicle, robotic status information pertaining to a proximate vehicle. The proximate vehicle is controlled independently of the first vehicle. The maneuver selection component is configured to select at least one driving maneuver based on the robotic status information using an automatic driving system of the vehicle.

According to one embodiment, a vehicle includes a driving assistant system that includes a robotic status component and a driver assistance component. The robotic status component is configured to determine, within a first vehicle, a robotic status of a proximate second vehicle. The driver assistance component is configured to notify a human driver of the first vehicle of the robotic status.

Figure 1:
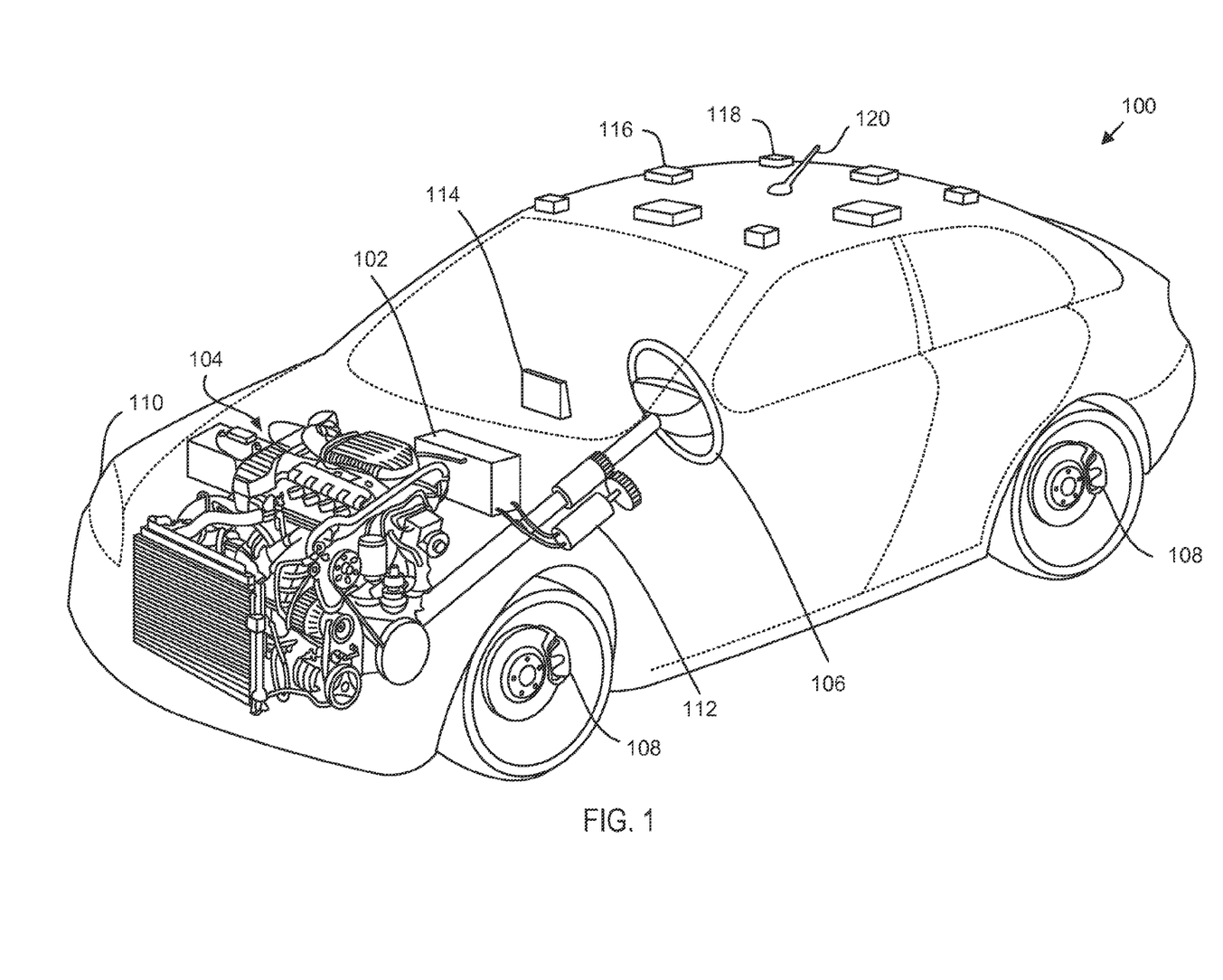
FIG. 1 is a perspective transparent view of a vehicle with a driving assistance system.

FIG. 1 is a perspective transparent view of a vehicle 100 with a driving assistance system 102. The vehicle 100 includes a driving assistance system 102 that provides assistance for a human driver or a driving control system, such as an automatic driving system. In one embodiment, the driving assistance system 102 provides suggestions, robotic status information, or other information to a driving control system which then controls driving of the vehicle. For example, the driving control system may control driving systems such as an engine 104, a steering system 106, a braking system 108, lights 110, and other vehicle control systems to driver or operate the vehicle 100. Although the engine 104 is illustrated as a combustion engine, any other type of engine or motor may be used. Other examples of systems that the driving assistance system 102 and/or a driving control system may interface with include a navigation system, a radio, power windows, power seats, or other electric control or assistance systems of a car. One or more actuators to control a throttle, braking system 108, steering system 106, or the like may be used. For example, an electric motor 112 may be used to control the steering system 106. In one embodiment, the driving assistance system 102 provides suggestions, robotic status information, or other information to a human driver who then controls driving of the vehicle. For example, the driving assistance system 102 may provide information to a human driver using an output device such as a display 114, speaker, or the like.

The driving assistance system 102 may receive input from one or more sensor units 116, 118 and/or an antenna 120. Example sensors which may be included in the sensor units 116, 118 include a visible wave length camera, an infrared camera, a radar system, a light detection and ranging (LIDAR) system, an ultrasonic transducer, a microphone, an antenna, a barcode reader, or the like. According to one embodiment, the driving assistance system 102 may provide suggestions, robotic status information, or other information obtained using the sensor units 116, 118 and/or antenna 120. Although the sensor units 116, 118 are shown mounted on a roof of the vehicle 100, sensors may be located at any location on or in the vehicle. For example, sensors may be built into a body of the vehicle 100 to improve appearance and/or specifically positioned to improve performance.

Figure 2:
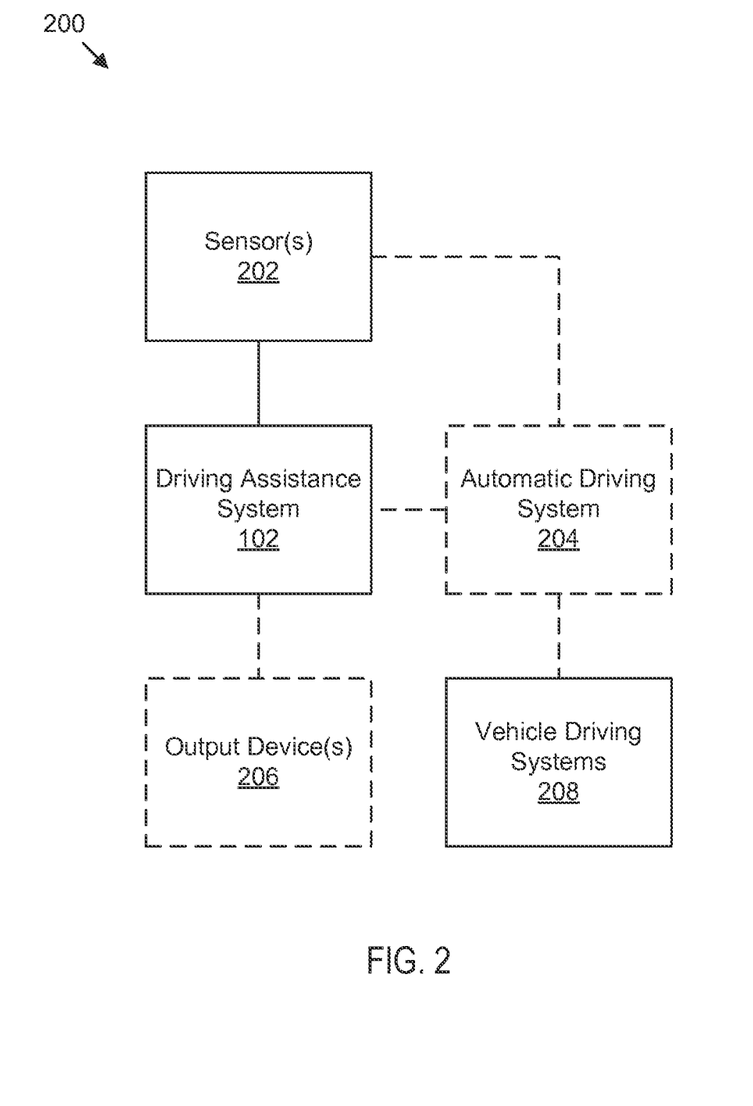
FIG. 2 is a schematic block diagram of a vehicle with a driving assistance system.

FIG. 2 is a schematic block diagram illustrating example components of one embodiment of a vehicle 200 with a driving assistant system 102, such as the vehicle 100 of FIG. 1. In addition to a driving assistant system 102, the vehicle 200 includes sensor(s) 202, an automatic driving system 204, output device(s) 206, and vehicle driving systems 208.

The sensor(s) 202 may gather information about nearby vehicles, a roadway, lanes, objects or pedestrians, road conditions, or any other information about a surrounding environment of the vehicle 200. The sensor(s) 202 may include a plurality of sensors, such as any of the sensors discussed in relation to FIG. 1. The sensor(s) 202 may be positioned to observe a surrounding environment in one or more directions. For example, the sensor(s) 202 may be positioned to observe vehicles and/or objects in every direction.

The automatic driving system 204 is configured to automatically control one or more vehicle driving systems 208 of a vehicle. The vehicle driving systems 208 may include an engine or motor for accelerating the vehicle 200, brakes for slowing the vehicle, a steering system for controlling a direction of a vehicle, and/or any other vehicle control or operating systems. The automatic driving system 204 may interface with vehicle driving systems 208 including both physical control systems and electronic control systems. In one embodiment, the automatic driving system 204 receives input from the driving assistance system and/or the sensor(s) 202. The automatic driving system 204 may or may not be capable of making its own driving decisions. For example, in one embodiment, the automatic driving system 204 is able to make its own driving decisions based on input from the sensor(s) and/or input, suggestions, or commands from the driving assistance system 102.

The automatic driving system 204 may not be included as part of the vehicle 200 in some embodiments, as indicated by the dotted lines. For example, in the absence of an automatic driving system 204, a human may provide input to the vehicle driving systems 208 to drive the vehicle 200. Furthermore, although the driving assistance system 102 and the automatic driving system 204 are illustrated as separate components, some embodiments include a driving assistance system 102 and an automatic driving system 204 integrated into a same system. For example, the driving assistance system 102 may be part of the automatic driving system 204 or the automatic driving system 204 may be part of the driving assistance system 102.

The output device(s) 206 are configured to output notifications to a human driver or passenger located within the vehicle 200. For example, a display screen, heads up display (HUD), speaker, or any other type of output device may be used to provide information or suggestions to a human driver. Similarly, even if the vehicle 200 is autonomously controlled by the automatic driving system 204 and driving assistance system 102, a human present in the vehicle may be informed of current conditions or information about driving. The vehicle 200 may or may not include output device(s) 206, as indicated by the dotted lines.

Figure 3:
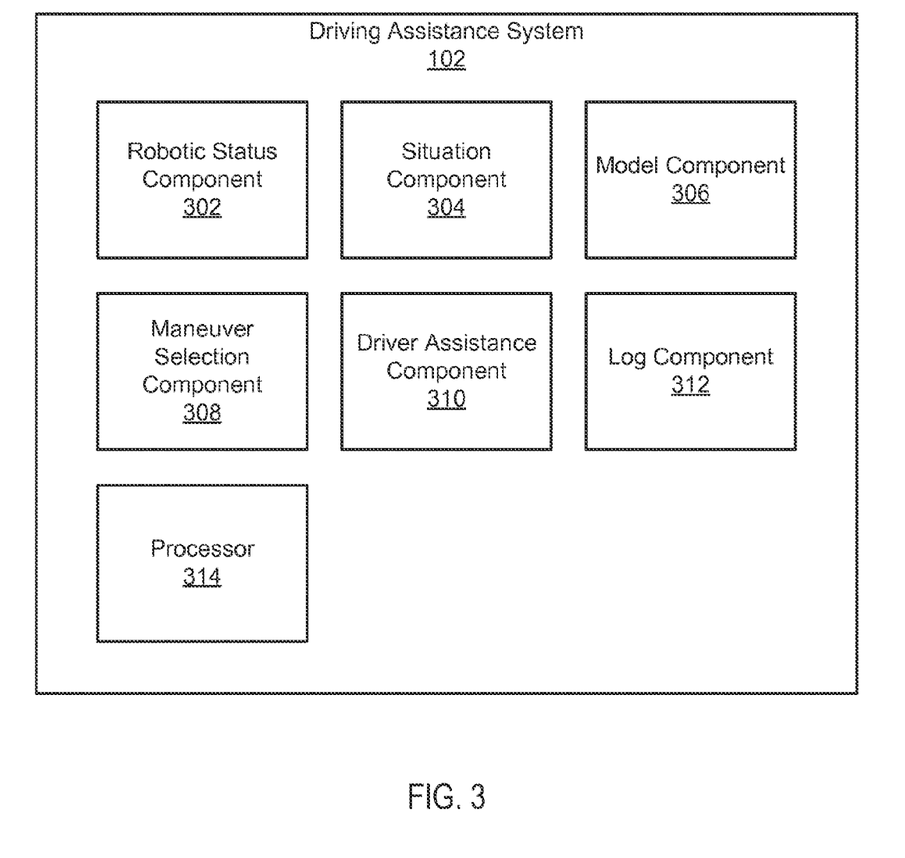
FIG. 3 is a schematic block diagram illustrating components of a driving assistance system.

FIG. 3 is a schematic block diagram illustrating example components of a driving assistance system 102. The driving assistance system 102 includes a robotic status component 302, a situation component 304, a model component 306, a maneuver selection component 308, a driver assistance component 310, a log component 312, and a processor 314. The components 302-314 are given by way of example and may not all be included in every embodiment. In fact, some embodiments may include any one or any combination of two or more of the components 302-314, without limitation.

The robotic status component 302 is configured to determine robotic status information for one or more vehicles that are proximal to a primary vehicle. For example, the robotic status component 302 may be located in a first vehicle and may determine robotic status information for vehicles that are close to the first vehicle. The robotic status component 302 determines the robotic status information without previously establishing a control relationship with the other vehicles. For example, the robotic status component 302 may determine the robotic status information of vehicles which are controlled independently of the primary vehicle.

In some cases, vehicles may establish control relationships as part of convoys. For example, one or more vehicles may join a convoy where a lead vehicle, driven by a robot or a professional human driver, provides instructions or leads other vehicles between destinations. For example, one or more vehicles may communicate with the lead vehicle to establish that the vehicles will follow the lead or instructions of a vehicle driven by a professional human driver. Thus, the vehicles in the convoy have offloaded some decision making or other determinations to a different vehicle. In one embodiment, the robotic status component 302 determines robotic status information without joining a convoy, or establishing any other previous control relationship. In one embodiment the robotic status component 302 may determine the robotic status information of independently controlled vehicles which are in another traffic lane than the primary vehicle, such as vehicles moving in an opposing direction, located in a cross street, travelling in the same direction but in a lane to the left or right of the primary vehicle's lane, in a driveway, parked, etc.

In one embodiment, the robotic status component 302 determines the robotic status information visually. For example, the robotic status component 302 may determine the robotic status information based on an image or other visual data obtained by a camera, barcode reader, or the like. In one embodiment, robotic status component 302 uses a camera or barcode reader to visually read robotic status information from the other vehicle. For example, the vehicle may have a barcode, quick response (QR) code, or other one-dimensional or two-dimensional barcode on an exterior of the vehicle that can be read using a camera or barcode reader. The information in the barcode may include robotic status information and/or a pointer that points to robotic status information for the vehicle. Similarly, a camera or other sensor may be used to detect a decal, symbol, or other visual feature that indicates a capability, model, or other information about a robotic capability or status of the nearby vehicle. In one embodiment, the robotic status component 302 identifies an appearance of a vehicle as being a robotically controlled vehicle. For example, the robotic status component 302 may be configured to identify a make and/or model of a vehicle that is known to include specific robotic control capabilities.

In one embodiment, the robotic status component 302 determines the robotic status information based on a radio signal. For example, an antenna 120 or radio may receive a radio signal that includes robotic status information and/or indicates a capability of a nearby vehicle. In one embodiment, the robotic status component 302 may use the antenna in conjunction with another sensor to match the robotic status information to a nearby vehicle. For example, the radio signal may indicate a color, make, model, location, license plate number, or any other feature that may be used to match the radio signal with the nearby vehicle.

In one embodiment, the robotic status component 302 receives a radio signal that is broadcasted by another vehicle. For example, other vehicles may repeatedly broadcast robotic status information which can be received by an antenna 120 or radio of a primary vehicle. The robotic status component 302 may receive the signal or robotic status information from the radio or antenna 120. The robotic status component 302 may then store the robotic status information for use by the driving assistance system 102 and/or an automatic driving system 204.

In one embodiment, the robotic status component 302 may query nearby vehicles for robotic status information. For example, the robotic status component 302 may identify a nearby vehicle using another sensor, such as a camera, LIDAR system, radar system, or the like, and send a wireless (e.g., radio or optical) signal requesting the nearby vehicle for its robotic status. The robotic status information may then be received from the other vehicle in response to the query. In one embodiment, the primary vehicle may include a radio frequency identification (RFID) tag reader that reads RFID tags from nearby vehicles. The RFID tag of the nearby vehicle may include robotic status information or a pointer that indicates where the primary vehicle can obtain the robotic status information.

The robotic status component 302 may obtain robotic status information or a pointer directly from the vehicle, such as visually or based on a radio signal. In one embodiment, a pointer may not include robotic status information but may be used by the robotic status component 302 to look up robotic status information in a database. For example, the pointer may include a code that points to robotic status information in a database stored by the primary vehicle. Similarly, the primary vehicle may be able to look up the pointer over a wireless communication network, such as a cellular or other network. For example, a wireless communication network may be operated according to the IEEE 802.11 standard, which is commonly known to industry groups as Wi-Fi. In one embodiment, the robotic status component 302 may receive the robotic status information over the network connection.

The robotic status component 302 may determine robotic status information that indicates information about a control system of a nearby vehicle. In one embodiment, the robotic status information indicates a response time of an automatic driving system of the nearby vehicle. For example, the robotic status information may indicate a response time for an automatic driving system 204 or collision avoidance system to detect objects, braking vehicles, or other obstructions with which the vehicle may collide. Similarly, the robotic status information may indicate a response time between when a potential collision is detected and how quickly an automatic driving system is able to apply the brakes, control the steering, or begin some other preventative maneuver.

The robotic status information may indicate hardware, software, or other details of an automatic driving system or collision avoidance system used for robotic control of the nearby vehicle. For example, the robotic status information may indicate a make, model, version, or the like, of an automatic driving system. In one embodiment, the robotic status information indicates a software version of an automatic driving system or collision avoidance system of a nearby vehicle. In one embodiment, the robotic status information indicates which control systems can be controlled by the automatic driving system. For example, the robotic status information may indicate that the automatic driving system is capable of controlling one or more of braking, throttle, steering, or other driving control system of the nearby vehicle. In one embodiment, the robotic status information may indicate that a human driver is at least partially in control of the vehicle. For example, the human driver may be driving the car from within a driver's seat of the vehicle or may be providing driving instructions from a remote location.

The robotic status information may indicate information about sensors of the nearby vehicle. For example, the robotic status information may indicate what sensors are used by an automatic driving system of the nearby vehicle. In one embodiment, the robotic status information may indicate that the nearby vehicle includes one or more of a visible wavelength camera, infrared camera, a radar system, LIDAR system, an ultrasonic transducer, antenna, or any other sensor. In one embodiment, the robotic status information may indicate a field of view, range, or sensitivity of a sensor.

The robotic status component 302 may determine robotic status information that indicates information about a current setting of a control system of a nearby vehicle. In one embodiment, the robotic status information may indicate that the nearby vehicle is at least partially under control of an automatic driving system. For example, the robotic status information may indicate that the nearby vehicle is operating without real-time input from a human driver. In one embodiment, the robotic status information indicates that a collision avoidance system of the nearby vehicle is currently enabled or indicates whether the automatic driving system is enabled. In one embodiment, the robotic status information indicates which features of the nearby vehicle are currently under control of the automatic driving system. For example, the robotic status information may indicate that one or more of steering, braking, and acceleration (throttle) are currently under control of the automatic driving system.

In one embodiment, the robotic status information may indicate a current value for an adjustable setting for an automatic driving system of the nearby vehicle. For example, the robotic status information may indicate a current value for a driving style for the automatic driving system. The driving styles may include a maximum speed driving style, a maximum safety driving style, and/or any other driving styles. In one embodiment, the robotic status information may indicate a current value for a robotic ego of an automatic driving system. For example, the ego may be adjusted to drive more aggressively or passively. In one embodiment, the adjustable setting may indicate whether the nearby vehicle will subordinate or defer to other vehicles. For example, the adjustable setting may indicate whether the nearby vehicle will attempt to pass other vehicles or slow to follow another vehicle.

In one embodiment, the robotic status information indicates whether the nearby vehicle is at least partially under control of a human driver. For example, the robotic status information may indicate that the nearby vehicle is under control of a remote human driver or a human driver within the vehicle. Similarly, the robotic status information may indicate what portions of the nearby vehicle are controlled by the human driver or whether an automatic driving system is active to assist the human driver. For example, the robotic status information may indicate that a human driver is driving the vehicle but that a collision avoidance system is active and ready to assist the human driver in an emergency situation.

The robotic status component 302 may determine robotic status information that indicates information about performance characteristics for the other vehicle. The robotic status information may indicate steering or fraction information. For example, the robotic status information may indicate a safe turning radius of the second vehicle based on speed. Similarly, the robotic status information may indicate an estimated stopping distance of the second vehicle or an acceleration capability. In one embodiment, the robotic status information may include details from which the robotic status component 302 can calculate a performance characteristic. For example, the robotic status information may include a current loaded weight of the nearby vehicle, current traction experienced by the nearby vehicle, a tire age for the tires of the nearby vehicle, or other information. The robotic status component 302 may be able to use this information, along with make and model information, to calculate performance capabilities of the nearby vehicle.

The robotic status component 302 may determine robotic status information that indicates whether a human is present in a nearby vehicle. For example, the robotic status information may indicate whether the nearby vehicle has any human passengers, even if the vehicle is under robotic control of an automatic driving system.

The situation component 304 is configured to determine a current situation of a primary vehicle, such as a vehicle in which the driving assistance system 102 is located. In one embodiment, the situation component 304 receives sensor input from one or more sensor(s) 202 and/or sensor units 116, 118. Using the sensor input, the situation component 304 may determine a position of the primary vehicle on a road, the location of other vehicles, and/or the location of objects, humans, or animals in a nearby vicinity. The situation component 304 may determine relative speed of other vehicles with respect to the primary vehicle and/or the road. In one embodiment, the situation component 304 may determine weather conditions or other environmental conditions that may affect driving performance.

In one embodiment, the situation component 304 is configured to detect a potential emergency based on a current driving situation and/or robotic status information of nearby vehicles. For example, the situation component 304 may determine that, based on proximity, vehicle performance, response times, and/or the like, a collision is likely to occur unless a collision avoidance maneuver is performed. In one embodiment, the situation component 304 may provide information about the current situation to other components 302, 306-314 of the driving assistance system and/or an automatic driving system 204.

The model component 306 is configured to model behavior of one or more nearby vehicles. For example, the model component 306 may model driving maneuvers, performance, and/or predicted behaviors of the nearby vehicles. In one embodiment, the model component 306 models behavior based on robotic status information obtained by the robotic status component 302 and/or a current situation determined by the situation component 304. In one embodiment, modeling a behavior includes predicting a behavior that the nearby vehicle will perform.

In one embodiment, the model component 306 may model steering, braking, acceleration, or other driving behavior of the nearby vehicle. For example, the model component 306 may predict, given an emergency situation, a response time of a driver or automatic driving system of the nearby vehicle. In one embodiment, the model component 306 may select a predetermined response time for braking, steering, or other maneuver for all humans. For robotic vehicles, such as vehicles under control of an automatic driving system, the model component 306 may select a response time based on specific information known about the automatic driving system of the vehicle. In one embodiment, the model component 306 may model predicted positions, velocity, or the like based on the responses times, vehicle handling capabilities, or the like. For example, the model component may predict a location at which the nearby vehicle would be able to stop or a rate at which the nearby vehicle would be able to steer to avoid a collision or other mishap in event of an emergency.

In one embodiment, the model component 306 models decision making of a nearby vehicle. For example, the model component 306 may determine what driving maneuvers the nearby vehicle will likely attempt to perform and when. In one embodiment, the model component 306 models when a nearby vehicle will perform a passing maneuver, a lane change, or other maneuver. In one embodiment, the model component 306 predicts a rate of acceleration and/or deceleration of a nearby vehicle. In one embodiment, the model component 306 models when a collision avoidance system will likely intervene to assist a human driver.

In one embodiment, the model component 306 models decision making of a nearby vehicle that may be executing a same version of software on a processor 314 of the driving assistant system 102. For example, if the robotic status information indicates a software version and author for an automatic driving system of a nearby vehicle, the model component 306 may emulate decision making by loading corresponding software and executing it using the processor 314. In one embodiment, the model component 306 may predict how the software will respond to a current or potential driving situation based on probability information for the software.

In one embodiment, the model component 306 may determine a computational model for the nearby vehicle. For example, the model component 306 may use robotic status information to determine a computational model to predict potential maneuvers and/or positions of the nearby vehicle in the future. Example robotic status information that may be used to determine the computational model may include a vehicle make and model, manufacturer and version of an automatic driving system, software version, sensor position and type, as well as any of the other robotic status information discussed above. The model component 306 may also predict whether the nearby vehicle will defer to the primary vehicle to stay out of the primary vehicle's way and/or reduce risk of collision.

The model component 306 may model behavior of one or more nearby vehicles, based on a current situation, to determine probable locations, velocities, or the details regarding the nearby vehicle in the near future. By predicting probable locations, velocities, or the like, the model component 306 may be able to anticipate emergency situations and perform a maneuver to reduce the likelihood of the emergency situation occurring. Similarly, the model component 306 may model behavior of nearby vehicles based on a potential maneuver by a primary vehicle. Thus, the model component 306 may be able to predict which maneuvers will lead to greater or reduced danger. The model component 306 may also predict how the nearby vehicle will respond to an emergency situation.

The maneuver selection component 308 selects a driving maneuver based on the robotic status information, a current situation, and/or modeled behavior of nearby vehicles. In one embodiment, the maneuver selection component 308 selects one or more of a steering maneuver, braking maneuver, and acceleration maneuver. For example, the maneuver selection component 308 may select a maneuver to avoid a collision or potential emergency situation. In one embodiment, the maneuver selection component 308 may select a maneuver to increase a following distance, change a lane, or the like. For example, the maneuver selection component 308 may select a maneuver based on one or more predicted maneuvers of nearby vehicles. In one embodiment, the maneuver selection component 308 selects a larger following distance when a vehicle in front of or behind the primary vehicles is currently driven by a human. In one embodiment, the model component 306 may identify that there is a high likelihood that a nearby vehicle will perform a maneuver that will lead to an emergency situation for the primary vehicle. The maneuver selection component 308 may select a maneuver that will reduce the risk that emergency situations such as potential collisions, driving off a road, or other emergency situations will occur.

In one embodiment, the maneuver selection component 308 may select a collision avoidance maneuver that will minimize any damage to the primary vehicle, to other vehicles, or to passengers of other vehicles. For example, the situation component 304 may determine that a primary vehicle is currently in an emergency situation and the maneuver selection component 308 may select a maneuver to prevent damage or injury. In one embodiment, the maneuver selection component 308 prioritizes maneuvers to first reduce injury to passengers, and then to reduce damage to the primary vehicle and/or other vehicles. For example, if the maneuver selection component 308 identifies a choice between impacting a vehicle without any passengers and a vehicle with passengers, the maneuver selection component may select a maneuver to impact the vehicle without passengers to minimize injury. Similarly, the maneuver selection component 308 may select different portions of a vehicle with which to collide in order to minimize injury to passengers of a primary vehicle or other vehicles. The selected driving maneuvers may take into account response times of nearby vehicle control systems and/or whether a nearby vehicle will defer to a primary vehicle.

In one embodiment, the maneuver selection component 308 provides a selected maneuver to an automatic driving system or collision avoidance system. For example, the selected maneuver may be provided as a command to cause the automatic driving system to execute the selected maneuver. In one embodiment, the driving assistance system 102 may interface directly with vehicle control systems (such as throttle, brake, and/or steering actuators) to perform the driving maneuver. In one embodiment, the maneuver selection component 308 provides the selected maneuver as a suggestion but leaves an ultimate decision for selecting and/or executing a maneuver to an automatic driving system.

In one embodiment, the maneuver selection component 308 interfaces with an automatic driving system to select the maneuver. For example, the maneuver selection component 308 may provide information determined by one or of the other components 302-306 and 310-314 to the automatic driving system. Based on this information, the automatic driving system may select a maneuver. In one embodiment, the maneuver selection component 308 executes the selected maneuver. The maneuver selection component 308 may execute the selected maneuver by generating instructions, using the processor 314, to control the automatic driving system 204 or to directly control vehicle driving systems 208, such as brakes, throttle, and steering. In one embodiment, the maneuver selection component 308 executes the selected maneuver by instructing an automatic driving system 204 or collision avoidance system to perform the maneuver. In one embodiment, the automatic driving system 204 of the vehicle may receive a notification instructing or suggesting that the selected maneuver be performed, and the automatic driving system 204 may perform the selected maneuver.

The maneuver selection component 308 may select a driving maneuver based on a current driving situation and/or based on anticipated behavior as modeled by the model component 306. The maneuver selection component 308 may select maneuvers to avoid potential emergency situations. For example, the maneuver selection component 308 may select the maneuvers to avoid a predicted location of another vehicle during any anticipated behavior, may select a maneuver to adjust a distance to another vehicle, and/or select a maneuver to safely position the vehicle in preparation for the anticipated behavior. The maneuver selection component 308 may select the maneuver based on an indication of capability of nearby vehicles and a current situation involving the nearby vehicles. For example, the maneuver selection component 308 may select a maneuver in anticipation of deference from a nearby vehicle based on the robotic status information. As another example, the maneuver selection component 308 may select a maneuver with a reduced braking rate in response to a vehicle behind a primary vehicle being under control of a human driver.

The driver assistance component 310 provides assistance to a human driver driving the primary vehicle. In one embodiment, the driver assistance component 310 assists the driver by providing information to help the driver drive safely or know about risks. For example, the driver assistance component 310 may notify the driver of the robotic status of nearby vehicles or warnings based on the robotic status or a potential emergency situation. In one embodiment, the driver assistance component 310 notifies the driver whether a nearby vehicle is under control of an automatic driving system. For example, the driver assistance component 310 may notify the driver that a nearby vehicle is under control of an automatic driving system, that a collision avoidance system is active, and/or that the nearby vehicle is under control of a human driver. The notification may include information indicating which of the nearby vehicles the notification corresponds to. As another example, the driver assistance component may notify a driver of an adjustable setting of the nearby vehicle, such as for subordination, or any other robotic status information.

In one embodiment, the driver assistance component 310 may provide a suggestion to the driver. For example, the driver assistance component 310 may suggest a driving maneuver selected by the maneuver selection component 308 to the driver to place the vehicle in a safer position. For example, the driver assistance component 310 may inform the driver that a nearby vehicle will have a hard time stopping very quickly and that the driver should increase a following distance, change lanes, or perform another driving maneuver to provide more space between the vehicle and nearby vehicle. In one embodiment, the driver assistance component 310 may simply provide a suggestion to change lanes, slow down, speed up, or perform any other driving maneuver. Example instructions may include a suggestion regarding a level of driving aggressiveness, increasing a braking rate, preparing to change lanes, a direction and or a degree to steer the vehicle, or the like. In one embodiment, instructions may include a suggestion regarding a level of driving aggressiveness to indicate that a human driver can expect deference, or at least fast reaction times, from other nearby, robotically controlled, vehicles.

The driver assistance component 310 may provide the notification in a visual, audio, or other manner. For example, suggested maneuvers, robotic status information, or other information may be displayed on a display screen, such as an in-dash display or a display of a GPS navigation device, smartphone, tablet computer, or the like. In one embodiment, a current video feed of an area nearby the vehicle may be displayed and the notification may be provided visually overlaying the video. In another embodiment, notifications are provided on a HUD. Example HUDs include wearable displays such as glasses, helmets, or the like. Other example HUDs include windshield display systems. The HUDs may be used to display information in a manner such that a driver need not turn their focus from the road. In one embodiment, a suggested driving path for a suggested maneuver may be displayed on the HUD, allowing the driver to follow the suggested path without looking away from the road. In one embodiment, a HUD may display locations of nearby vehicles, in which the robotic status of each vehicle is encoded via a distinctive color or icon.

In one embodiment, the driver assistance component 310 provides driving assistance by providing input to control braking, steering, throttle, or other vehicle control system. In one embodiment, the driver assistance component 310 selects a driving maneuver to assist the human driver based on a current driving situation and current input by the human driver. For example, if a human driver is not braking fast enough to match a suggested maneuver, such as braking to avoid a collision, the driver assistance component 310 may increase braking to assist the driver. Increased braking may be provided, for example, when a human driver of a primary vehicle is following a nearby vehicle controlled by an automatic driving system. Similarly, the driver assistance component 310 may limit over-steering, increase steering, or perform other driving maneuver to match a suggested maneuver or to avoid a collision, rolling the vehicle, driving off the road, or other mishap. In one embodiment, full maneuvers may be performed, such as making a lane change, steering or braking to avoid a collision, or the like.

The log component 312 maintains a log of robotic status information and/or driving maneuvers performed by the vehicle. For example, the log component 312 may store an indication of robotic status information and a driving maneuver selected based on the robotic status information. In one embodiment, this information may provide evidence in the case of an accident. For example, the evidence may be used for insurance and/or legal purposes for determining who was at fault. The parties at fault may include a driver, a manufacturer or provider of an automatic driving system, or the like. In one embodiment, the log component 312 logs the robotic status information, suggestions provided to a driver, and/or driving history information for the driver. The log component 312 may also log sensor data indicating a location of the vehicle, velocity, relative locations of other vehicles, and/or the velocity of other vehicles.

Figure 4:
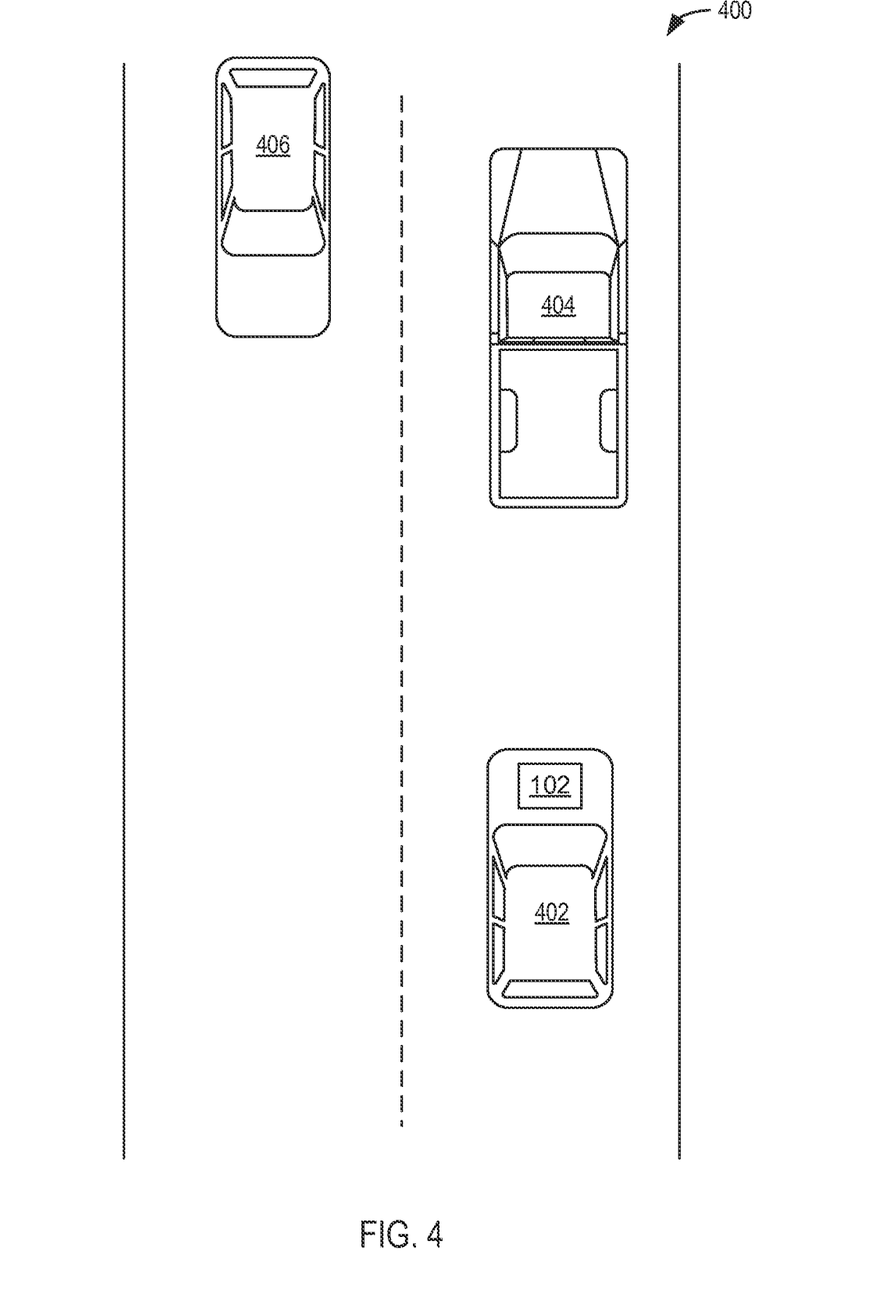
FIG. 4 is a top plan view of a road with vehicles driving thereon.
Figure 5:
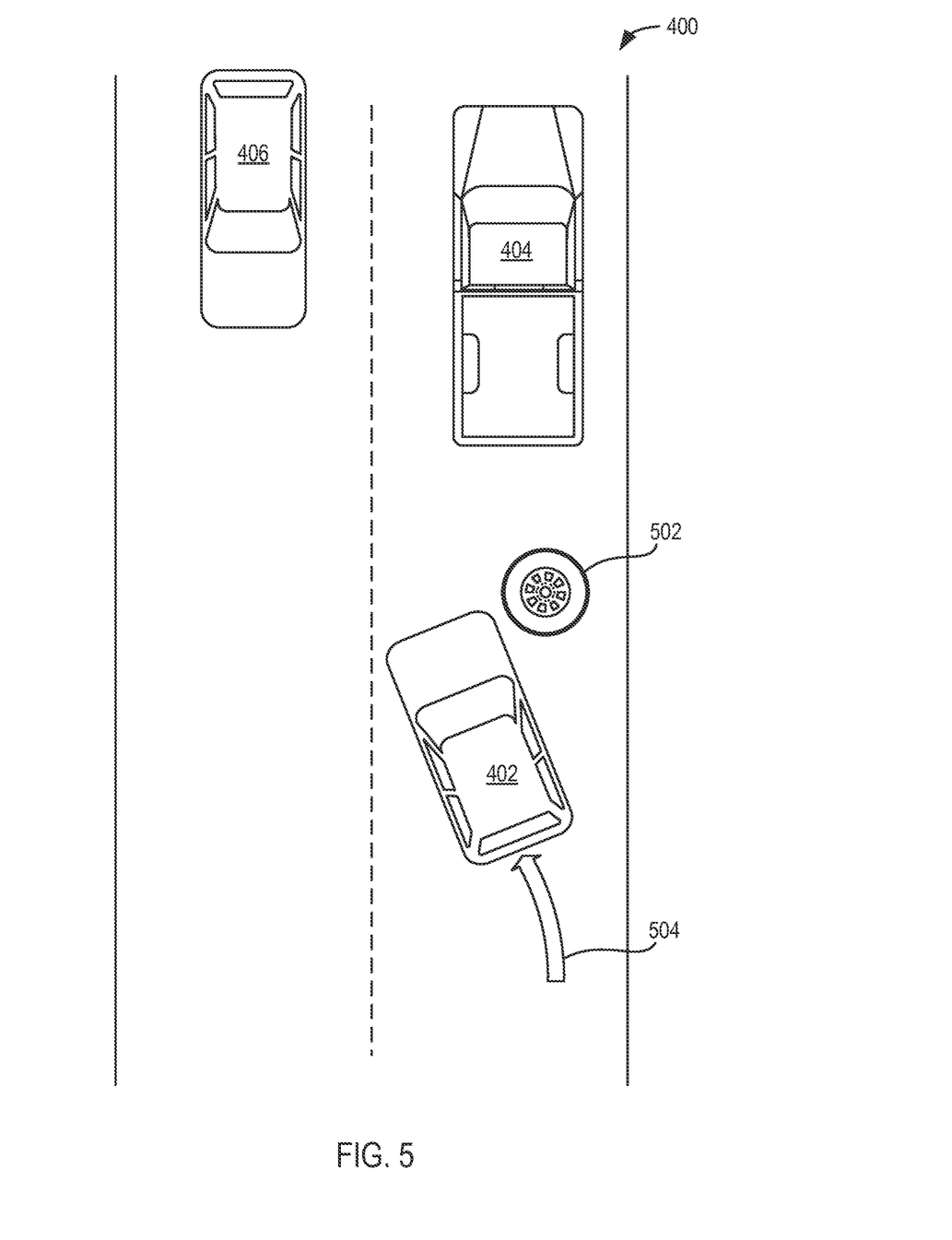
FIG. 5 is a top plan view of a road with a vehicle in an emergency situation.
Figure 6:
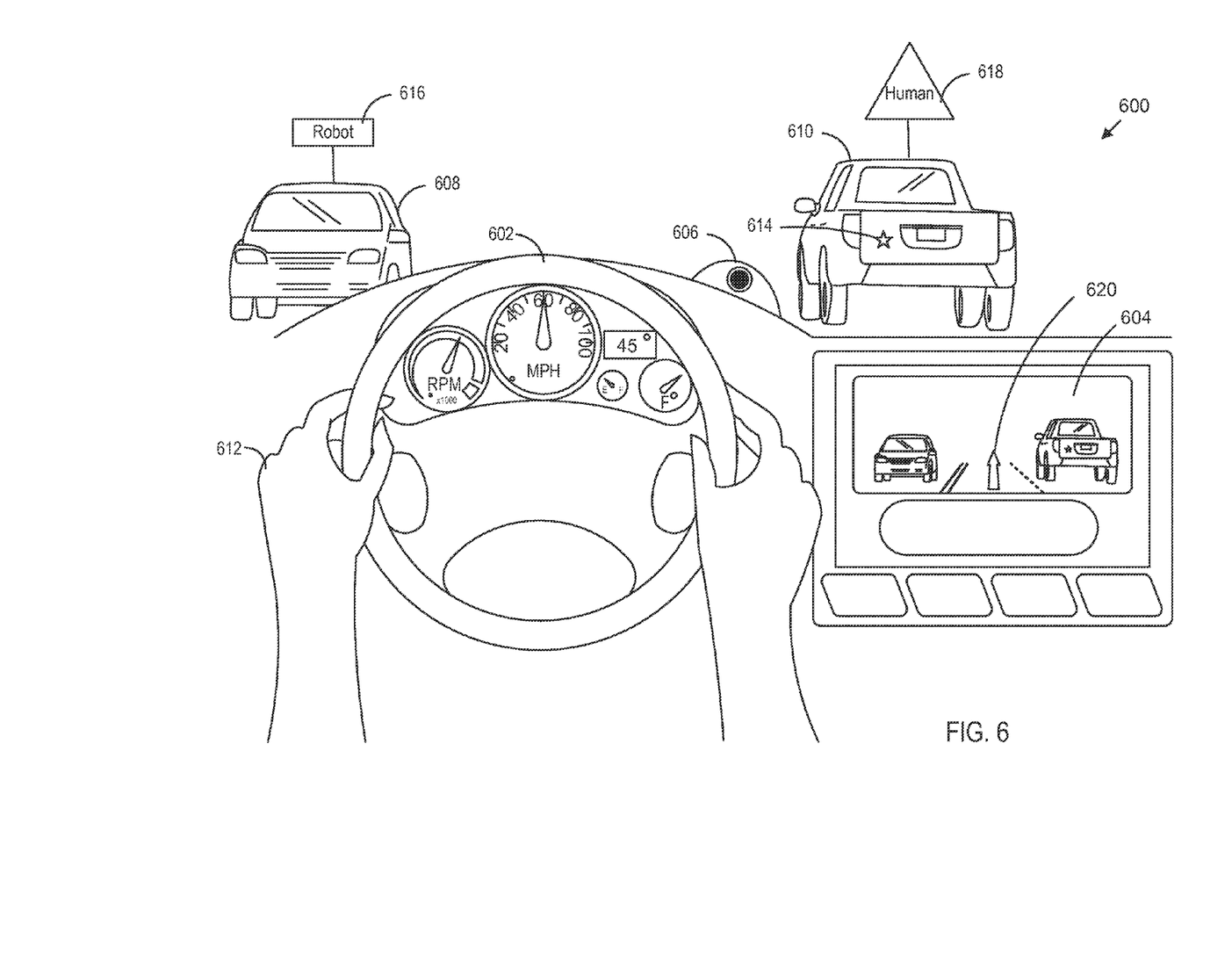
FIG. 6 is a perspective view of a driver within a cabin of a vehicle.

Turning now to FIGS. 4-6, example operation of the driving assistance system 102 will be illustrated. FIG. 4 is a top plan view of a road 400 and a vehicles 402, 404, 406 driving on the road. The vehicles include a first vehicle 402, a second vehicle 404, and a third vehicle 406. According to one embodiment, the first vehicle 402 includes a driving assistance system 102 that determines robotic status information for the second and third vehicles 404, 406.

In one embodiment, a robotic status component 302 of the driving assistance system 102 determines a robotic status for each of the second vehicle 404 and the third vehicle 406. The robotic status information may include any of the information discussed above in relation to FIG. 3. For example, the robotic status component 302 may determine that the second vehicle 404 is driven by a human driver and does not have a currently active collision avoidance system. The robotic status component 302 may further determine that the third vehicle 406 is independently controlled by an automatic driving system. Additional information regarding the vehicles 404, 406, or any of the other above discussed robotic status information, may also be obtained.

A situation component 304 of the first vehicle 402 may determine a current situation of the first vehicle 402 with regard to the other vehicles. For example, the situation component 304 may determine a distance between the first vehicle 402 and the second vehicle 404 and/or a distance between the first vehicle 402 and the third vehicle 406. The situation component 304 may also determine additional situational information, such as speed and direction (velocity) and/or relative motion between the vehicles 402, 404, 406. In one embodiment, the situation component 304 may determine whether the first vehicle 102 is in a potential emergency situation.

A model component 306 of the first vehicle 402 may model anticipated behavior of one or more of the second vehicle 404 and third vehicle 406. In one embodiment, the model component 306 models behavior to predict any emergency situations or problems. The model component 306 may also model how the other vehicles 404, 406 would react to a possible maneuver by the first vehicle 402. By modeling different situations, the model component 306 may identify what maneuvers are least likely to lead to an emergency situation, damage, and/or injury.

A maneuver selection component 308 may select a maneuver to perform based on the robotic status information determined by the robotic status component 302, the current situation determined by the situation component 304, and/or one or more maneuvers modeled by the model component 308. In one embodiment, for example, the maneuver selection component 308 may select a maneuver to increase a following distance between the first vehicle 402 and the second vehicle 404. The maneuver may include letting of the throttle, braking, or performing another maneuver.

FIG. 5 illustrates a top plan view of the road 400 and vehicles 402, 404, 406 with the first vehicle 402 in an emergency situation. Specifically, a tire 502 is shown in front of the first vehicle 402. According to one embodiment, the situation component 304 may identify the situation as an emergency situation based on input from one or more sensors and/or robotic status information. For example, the situation component 304 may determine that there is an extremely high likelihood of an accident unless an automatic driving system quickly performs a driving maneuver to avoid the tire 502. The model component 306 may model how the other vehicles might react to the first vehicle 402 swerving to miss the tire 502.

In one embodiment, the model component 306 may emulate how the third vehicle 406 would react to swerving into the third vehicle's lane as indicated by arrow 504. Similarly, the model component 306 may estimate how much damage would likely result in a collision between the first vehicle 402 and third vehicle 406. For example, the model component 306 may estimate the damage based on a size of the vehicles 402, 406 and/or their relative speed. Furthermore, the model component 306 may take into account the robotic status of the third vehicle 406 and/or how likely the third vehicle 406 will detect the danger and/or be able to stop. Similarly, the model component 306 may determine a likelihood of injury to any passengers of the first vehicle 402 and third vehicle 406. In one embodiment, the model component 306 may estimate damages and/or injuries that may occur in a collision between the first vehicle 402 and the tire 502. Similarly, the model component 306 may determine a likelihood that a collision with the tire 502 may lead to a further collision, or the first vehicle 402 driving off the road 400. The model component 306 may also model any other vehicles that are nearby or even how unknown vehicles that may be nearby might respond.

A maneuver selection component 308 may select a maneuver that will likely result in the least injuries or damages. For example, the maneuver selection component 308 may select a swerving maneuver as indicated by the arrow 504 because the model component 306 determined that the third vehicle 406 will be able to stop in time to avoid a collision.

If the first vehicle 402 is under control of an automatic driving system or has an enabled collision avoidance system, the driving maneuver (see arrow 504) may be executed by an automatic driving system 204. For example, the maneuver selection component 308 may provide the selected maneuver to the automatic driving system 204 to be executed. In one embodiment, a driver assistance component 310 may assist a driver in performing the selected maneuver.

FIG. 6 illustrates a driver's point of view 600 from within a cabin of a primary vehicle that includes a driving assistance system 102, according to one embodiment. The cabin includes a dashboard with a steering wheel 602, an in dash display 604, and a camera 606. Through a windshield (not shown) a first vehicle 608 and second vehicle 610 are shown. According to one embodiment, a human, with hands 612, is in control of driving the vehicle.

A robotic status component 302 determines a robotic status of the vehicles 608, 610. The second vehicle 610 includes a symbol 614 that indicates a robotic status of the vehicle. For example, the symbol 614 may indicate that the second vehicle 610 does not include an automatic driving system or collision avoidance system. Other symbols may indicate that a vehicle has a collision avoidance system or automatic driving system, or may indicate any other robotic status or performance information.

A driver assistance component 310 notifies the driver of a robotic status of the vehicles 608, 610. Notifications 616, 618 are displayed on a windshield HUD. The notifications 616, 618 indicate that the first vehicle 608 is controlled by a robot (such as an automatic driving system) and the second vehicle 610 is controlled by a human 618. The notifications include different shapes so that the human driver can more quickly determine their robotic status. In one embodiment, different colors, outlines or other symbols may be used to further increase recognition of robotic status by a human driver. In one embodiment, the notifications 616, 618 may be displayed on the in-dash display 604 or on a phone, tablet, or other portable electronic device. The camera 606 may be used to observe a position of the driver's head and eyes to properly position the notifications 616, 618 on the screen. In another embodiment, a HUD may include a wearable HUD such as glasses, a visor, a helmet, or other transparent display that is capable of displaying information for the driver. The driver assistance component 310 also provides a suggested maneuver notification 620 on the in-dash display. The maneuver notification 620 indicates a path for the driver to follow. In some embodiments, the suggested maneuver may indicate a path to take to avoid a collision, to increase safety, or for any other purpose. Some notifications may be played using a speaker, such as car speakers of the vehicle.

Figure 7:
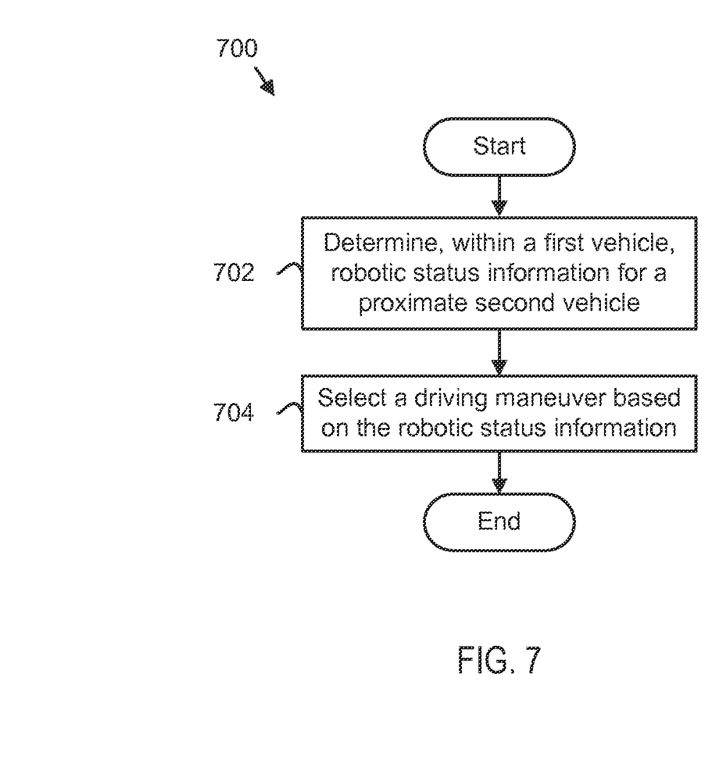
FIG. 7 is a schematic of a method for driving assistance.

FIG. 7 is a schematic flow chart diagram illustrating a method 700 for driving assistance, according to one embodiment. The method 700 may be used to assist an automatic driving system or a human driver. The method 700 may be performed by a driving assistance system 102, such as the driving assistance system 102 of FIG. 3. In one embodiment, the driving assistance system 102 may include only one or any combination of two or more of the components 302-314 illustrated in FIG. 3.

The method 700 begins and a robotic status component 302 determines 702, within a first vehicle, robotic status information for a proximate second vehicle. The robotic status component 302 may determine 702 robotic status information for each vehicle that comes within a sensor range of the first vehicle. For example, the robotic status component 302 may attempt to determine 702 robotic status information for all vehicles within a field of view of a camera, barcode scanner, or other sensor of the first vehicle. As another example, the robotic status component 302 may attempt to determine 702 robotic status information for all vehicles within a range of an antenna or radio of the first vehicle. The robotic status component 302 may determine 702 any of the illustrative robotic status information discussed herein.

A maneuver selection component 308 selects 704 a driving maneuver based on the robotic status information. In one embodiment, the maneuver selection component 308 selects 704 a driving maneuver for the first vehicle based on whether a nearby vehicle is under control of a human driver or an automatic driving system. For example, the maneuver selection component 308 may select 704 a driving maneuver that allows for greater error by the human driver than by an automatic driving system. The maneuver selection component 308 may select 704 the driving maneuver based on any of the robotic status information and/or based on a current situation determined by the situation component 304. The maneuver selection component 308 may select 704 any maneuver that may be performed by a vehicle, including any of the other driving maneuvers discussed herein.

Figure 8:
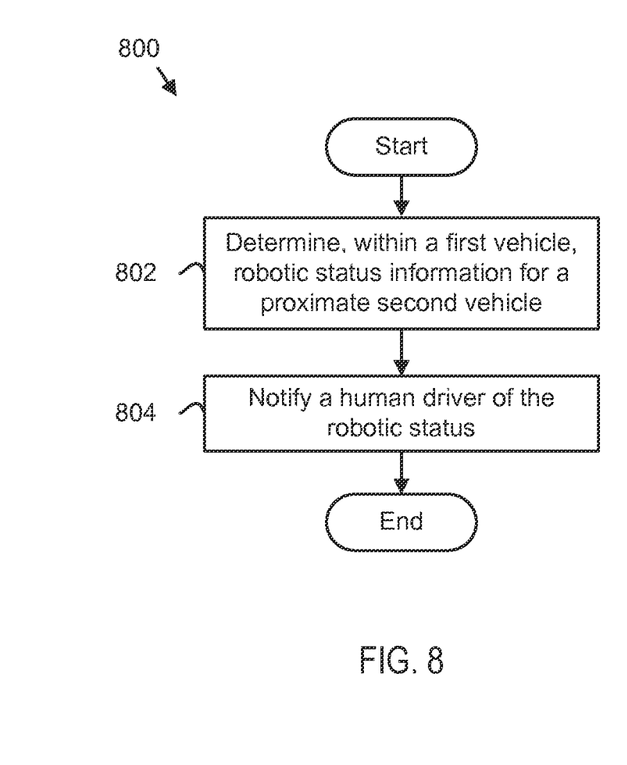
FIG. 8 is a schematic of a method for assisting a human driver.

FIG. 8 is a schematic flow chart diagram illustrating a method 800 for assisting a human driver, according to one embodiment. The method 800 may be performed by a driving assistance system 102, such as the driving assistance system 102 of FIG. 3. In one embodiment, the driving assistance system 102 may include only one or any combination of two or more of the components 302-314 illustrated in FIG. 3.

The method 800 begins and a robotic status component 302 determines 802, within a first vehicle, robotic status information for a proximate second vehicle. The robotic status component 302 may determine 802 robotic status information for each vehicle that comes within a sensor range of the first vehicle. For example, the robotic status component 302 may attempt to determine 802 robotic status information for all vehicles within a field of view of a camera, barcode scanner, or other sensor of the first vehicle. As another example, the robotic status component 302 may attempt to determine 802 robotic status information for all vehicles within a range of an antenna or radio of the first vehicle. The robotic status component 302 may determine 802 any of the illustrative robotic status information discussed herein.

A driver assistance component 310 notifies 804 a human driver of the robotic status of the proximate second vehicle. In one embodiment, the driver assistance component 310 notifies 804 the human driver by playing an audible notification on a speaker. For example, the driver assistance component 310 may play audio that includes a voice stating that a vehicle in front, behind, or at some other location in respect to the vehicle is under control of a human driver, automatic driving system, or the like. In one embodiment, the driver assistance component 310 notifies 804 the human driver by displaying a notification on a display, such as an in-dash display, HUD, phone display, tablet display, or other display. For example, the driver assistance component 310 may display notifications overlaying a video of the nearby vehicle. The driver assistance component 310 may notify 804 the human driver regarding a driving setting, a likely maneuver, or other information about a nearby vehicle. A human driver can then take into account the abilities, robotic status, and/or likely future maneuvers of the other vehicles.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A computer readable storage medium comprising program code for causing one or more processors to perform a method, the method comprising:
   sensing, by a first vehicle, a robotic status visual feature affixed to an exterior of a proximate second vehicle, the robotic status visual feature including a barcode indicating specifications of a robotic control system of the proximate second vehicle and a current level of robotic control over the proximate second vehicle;
   determining, within the first vehicle, robotic status information pertaining to the proximate second vehicle, wherein the proximate second vehicle is controlled independently of the first vehicle; and
   selecting, at the first vehicle, at least one driving maneuver based on the robotic status information of the proximate second vehicle using an automatic driving system of the first vehicle.

2. The computer readable storage medium of claim 1, wherein determining the robotic status information comprises visually reading the robotic status information from the proximate second vehicle.

3. The computer readable storage medium of claim 1, further comprising providing the selected at least one driving maneuver to a user interface configured to communicate the selected at least one driving maneuver to a human driver of the first vehicle.

4. The computer readable storage medium of claim 2, wherein visually reading the robotic status information comprises reading the barcode comprising at least one of a one-dimensional barcode or a two-dimensional barcode on the proximate second vehicle.

5. The computer readable storage medium of claim 2, wherein visually reading the robotic status information comprises visually reading the barcode comprising a quick response (QR) code on the proximate second vehicle.

6. The computer readable storage medium of claim 1, wherein determining the robotic status information comprises identifying a pointer corresponding to the proximate second vehicle and locating the robotic status information within a database using the pointer.

7. The computer readable storage medium of claim 1, wherein determining the robotic status information comprises obtaining an indication that the proximate second vehicle is at least partially controlled by a human driver.

8. The computer readable storage medium of claim 1, wherein determining the robotic status information comprises obtaining an indication that a collision avoidance system of the proximate second vehicle is enabled.

9. The computer readable storage medium of claim 1, wherein determining the robotic status information comprises obtaining an indication regarding which features of the proximate second vehicle are currently under control of an automatic driving system.

10. The computer readable storage medium of claim 9, wherein determining the robotic status information comprises obtaining an indication that the automatic driving system of the proximate second vehicle is configured to control steering of the second vehicle.

11. The computer readable storage medium of claim 9, wherein determining the robotic status information comprises obtaining an indication that the automatic driving system of the proximate second vehicle is configured to control braking of the second vehicle.

12. The computer readable storage medium of claim 1, wherein determining the robotic status information comprises obtaining an indication of a response time of an automatic driving system of the proximate second vehicle.

13. The computer readable storage medium of claim 1, wherein determining the robotic status information comprises obtaining an indication of a type of sensor of an automatic driving system of the proximate second vehicle.

14. The computer readable storage medium of claim 13, wherein the robotic status information indicates that the automatic driving system of the proximate second vehicle comprises a camera.

15. The computer readable storage medium of claim 13, wherein the robotic status information indicates that the automatic driving system of the proximate second vehicle comprises a radar system.

16. The computer readable storage medium of claim 13, wherein the robotic status information indicates that the automatic driving system of the proximate second vehicle comprises a light detection and ranging (LIDAR) system.

17. The computer readable storage medium of claim 13, wherein the robotic status information indicates that the automatic driving system of the proximate second vehicle comprises an ultrasonic transducer.

18. The computer readable storage medium of claim 1, wherein determining the robotic status information comprises obtaining an indication of a manufacturer of an automatic driving system of the proximate second vehicle.

19. The computer readable storage medium of claim 1, wherein determining the robotic status information comprises obtaining an indication of a presence of a human in the proximate second vehicle.

20. The computer readable storage medium of claim 1, wherein the first vehicle and proximate second vehicle do not have a previous control relationship prior to determining the robotic status information.

21. The computer readable storage medium of claim 1, wherein selecting the at least one driving maneuver comprises selecting a collision avoidance maneuver based on the robotic status information.

22. The computer readable storage medium of claim 1, wherein selecting the at least one driving maneuver comprises selecting a lane change maneuver based on the robotic status information.

23. The computer readable storage medium of claim 1, wherein the method further comprises storing an indication of the robotic status information and the at least one driving maneuver selected based on the robotic status information.

24. A system comprising:
a robotic status component of a first vehicle, the robotic status component configured to:
identify a robotic status visual feature comprising a barcode affixed to an exterior of a second vehicle that is proximate to the first vehicle;
sense, within the first vehicle, the robotic status visual feature, the barcode indicating specifications of a robotic control system and a current level of robotic control over the second vehicle;
determine, within the first vehicle, robotic status information pertaining to the proximate second vehicle based on the sensed robotic status visual feature, wherein the second vehicle is controlled independently of the first vehicle; and
a maneuver selection component configured to select at least one driving maneuver based on the robotic status information of the second vehicle using an automatic driving system of the first vehicle.

25. The system of claim 24, wherein the robotic status component is further configured to determine a robotic status of a proximate third vehicle, wherein determining comprises determining based on an indication by the third vehicle of one or more specifications of a robotic control system of the third vehicle and a current level of robotic control over the third vehicle, and wherein the maneuver selection component is configured to select the at least one driving maneuver based on the robotic status information of the second vehicle and the robotic status information of the third vehicle.

26. The system of claim 24, wherein the robotic status component determining the robotic status information comprises obtaining an indication that an automatic driving system of the second vehicle is at least partially disabled.

27. The system of claim 24, wherein the robotic status component determining the robotic status information comprises obtaining an indication regarding which features of the second vehicle are under control of a human driver.

28. The system of claim 24, wherein the robotic status component determining the robotic status information comprises obtaining an indication that the second vehicle is currently under control of an automatic driving system of the second vehicle.

29. The system of claim 24, wherein the robotic status component determining the robotic status information comprises obtaining an indication that the second vehicle is currently controlled by an automatic driving system without real-time input from a human driver.

30. The system of claim 24, wherein the robotic status component determining the robotic status information comprises obtaining an indication of a field of view of a sensor of an automatic driving system of the second vehicle.

31. The system of claim 24, wherein the robotic status component determining the robotic status information comprises obtaining an indication of a range of a sensor of an automatic driving system of the second vehicle.

32. The system of claim 24, wherein the robotic status component determining the robotic status information comprises obtaining an indication of a software version of an automatic driving system of the second vehicle.

33. The system of claim 24, wherein the robotic status component determining the robotic status information comprises obtaining an indication of a current value for an adjustable setting of an automatic driving system of the second vehicle.

34. The system of claim 33, wherein the adjustable setting comprises a setting for a driving style for the automatic driving system.

35. The system of claim 33, wherein the adjustable setting comprises a setting for whether the second vehicle will subordinate to other vehicles.

36. The system of claim 24, wherein the maneuver selection component selects the driving maneuvers independently of one of a human driver and an automatic driving system of the second vehicle.

37. The system of claim 24, wherein the maneuver selection component selects a maneuver to adjust a following distance based on the robotic status information.

38. The system of claim 37, wherein the maneuver selection component selects the maneuver to increase the following distance when the robotic status information indicates that the second vehicle is under manual control of a human driver.

39. The system of claim 24, further comprising a prediction component configured to predict a response time of the second vehicle based on the robotic status information, wherein the maneuver selection component selects a maneuver based on the prediction of the second vehicle's response time.

40. A computer readable storage medium comprising program code for causing one or more processors to perform a method, the method comprising:
sensing within a first vehicle, a first robotic status visual feature comprising a barcode affixed to an exterior of a second vehicle proximate to the first vehicle, the barcode indicating a robotic status of the second vehicle and a current level of robotic control over the second vehicle;
determining, within the first vehicle, the robotic status of and the current level of robotic control over the second vehicle;
sensing, within the first vehicle, a second robotic status visual feature comprising a second barcode provided by a third vehicle that is proximate to the first vehicle, the second barcode indicating a robotic status of the third vehicle and a level of robotic control over the third vehicle;
determining, within the first vehicle, the robotic status of and the level of robotic control over the third vehicle; and
notifying a human driver of the first vehicle of the robotic status of the second vehicle and of the robotic status of the third vehicle.

41. The computer readable storage medium of claim 40, wherein notifying comprises generating a sound to notify the driver of the robotic status of the second and third vehicles.

42. The computer readable storage medium of claim 40, wherein notifying comprises displaying a notification of the robotic status of the second and third vehicles.

\* \* \* \* \*